United States Patent Office 3,535,333
Patented Oct. 20, 1970

3,535,333
COPPER PHTHALOCYANINE DYESTUFFS
Kuhne Rudolf and Fritz Meininger, Frankfurt am Main, Germany, and Rolf Wilhelm Pfirrmann, Lucerne, Switzerland, assignors to Farbwerke Hoechst Aktiengesellschaft vormals Meister Lucius & Bruning, Frankfurt am Main, a corporation of Germany
No Drawing. Continuation-in-part of application Ser. No. 666,532, July 27, 1967. This application Sept. 10, 1969, Ser. No. 856,834
Claims priority, application Germany, Oct. 3, 1962, F 37,949
Int. Cl. C09b 47/04
U.S. Cl. 260—314.5        6 Claims

ABSTRACT OF THE DISCLOSURE

The invention is concerned with amino dyestuffs derivatives of phthalocyanine sulfonamide dyestuffs and their quaternary salts.

---

This application is a continuation in part application of our copending application Ser. No. 666,532 filed July 27, 1967, now abandoned, which in turn is a divisional application of U.S. Pat. 3,354,182, filed Oct. 2, 1962.

The present invention relates to novel copper phthalocyanine dyestuffs and to a process for preparing them; especially it relates to copper phthalocyanine dyestuffs of the general formula

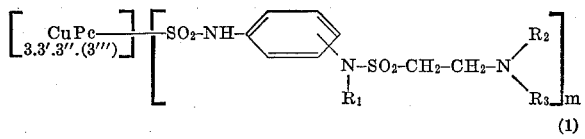

or

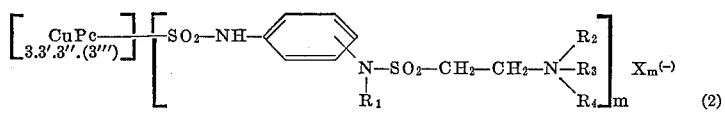

in which CuPc is a copper phthalocyanine moiety, $R_1$, $R_2$, $R_3$ and $R_4$ are hydrogen, methyl or ethyl, $X^{(-)}$ is a chlorine anion, $HSO_4$, $SO_4/2$, $C_2H_5$—O—$SO_3$ or $$CH_3-O-SO_3$$

and $m$ is 3 or 4, the sulfonamide substituent being linked in meta- or para-position to the carbon atom of the benzenoid ring of the Pc nucleus and at most one sulfonamide substituent being linked to a benzenoid ring of the Pc nucleus.

It has been found that novel copper phthalocyanine dyestuffs of the general Formula 1 or 2 described above can be prepared by reacting in an aqueous solution or suspension.

(a) Organic dyestuffs of the general formula

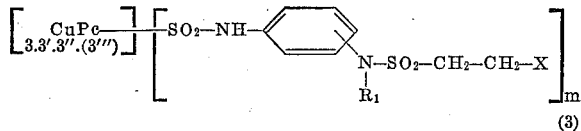

or

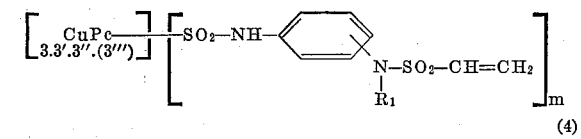

in which CuPc, $R_1$, X $m$ and the positions of the sulfonamide substituent on the benzenoid ring of the Pc nucleus and the number of the sulfonamide substituents on said benzenoid rings are defined as above, with ammonia, primary or secondary aliphatic amines and treating the amines thus obtained in known manner, if desired, with alkylating agents or inorganic acids or (b) Dyestuffs of the general Formula 3 with tertiary aliphatic amines.

As starting dyestuffs of the general Formulae 3 and 4 there may be used copper phthalocyanine dyestuffs which contain groups of the formula

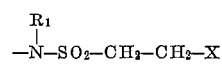

or

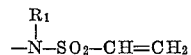

$R_1$ and X being defined as more above.

Copper phthalocyanine dyestuffs used as starting compounds in the process of the present invention having the Formula 3 can be prepared by condensing copper phthalocyanine dyestuffs containing 3 or four sulfonyl halogen groups capable of reacting with N-ethionylaminophenylamines or N-isoethionylaminophenylamines and esterifying the hydroxy groups of the β-hydroxy-ethyl-sulfonic acid radicals in the dyestuffs containing iso-ethionylamino groups with a hydrochloric acid or sulfuric acid. The starting compounds of the Formula 3 in which X represents a halogen atom, especially a chlorine atom, can be prepared by reacting corresponding β-hydroxyethyl-sulfonyl-amino groups containing dyestuffs with halogen-yielding agents as, for example, thionyl chloride. Starting compounds of the Formula 4 can be prepared by treating a starting compound of Formula 3 wherein X represents —$OSO_3H$, with an alkaline agent, such as sodium hydroxide.

Primary or secondary amines suitable for the reaction with compounds of the general Formula 3 or 4 are, for example, ammonia, methylamine, dimethylamine and diethylamine.

The reaction of compounds of the general Formulae 3 and 4 with ammonia, primary or secondary amines can be carried out within a large temperature range, namely at about 20° to 150° C. On one hand, however, the optimum temperature to be used in each individual case depends to a large extent upon the compound of the Formulae 3 and 4 used, the reaction conditions being particularly influenced by the substituents $R_1$ and the acid radical X, and on the other hand upon the amine used. Thus, when using aliphatic bases, the most favorable temperature range is often between about 40° and 80° C. When using higher temperatures, it is in some cases advantageous—with regard to the volability of the compounds used—to operate with an autoclave. The reaction of compounds of the general Formulae 3 and 4 with the amines mentioned can be carried out in an aqueous solution or an aqueous suspension, in the last case, if desired, with the addition of a dispersing agent, while stirring and kneading, in order to obtain a homogeneity of the reaction mixture favorable for the reaction. The reaction components can also be reacted in other indifferent solvents as, for example, dioxane, tetrahydrofurane, dimethylformamide or benzene.

The dyestuffs of the general Formula 1 obtained as described above by reacting compounds of the general Formula 3 or 4 with the primary or secondary amines mentioned above may be used for dyeing per se or, if desired, reacted in known manner either with alkylating agents, for example, alkyl halides such as methyl iodide, or dialkyl sulfates such as dimethyl sulfate, or with p-toluene-sulfonic acid alkylesters, or with inorganic acids as, for example, hydrochloric acid, hydrobromic acid or sulfuric acid to form the corresponding ammonium compounds of the general Formula 2. For this purpose the dyestuffs of the general Formula 1 are allowed to react in an aqueous suspension or solution or dissolved in a sufficiently indifferent solvent as, for example, benzene, acetic acid ethylester, with the alkylating agent or the acid at temperatures ranging between about 10° and 100° C., preferably between about 20° and 40° C.

When reacting dyestuffs of the general Formula 3 with a tertiary aliphatic amine as, for example, trimethylamine there are obtained directly ammonium compounds of the general Formula 2. The reaction conditions are the same as those of the reaction with primary or secondary amines described above.

The novel dyestuffs obtained by the process of the present invention may be used for dyeing natural and synthetic textile materials as, for example, of cotton, viscose, regenerated cellulose, wool, silk, fibres of cellulose acetate, polyamide and polyacrylonitrile. There are obtained fast intense dyeings which are distinguished, above all, by a very good fastness to wet processing.

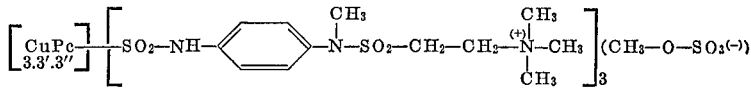

Such dyestuffs are applied to the fiber according to the usual dyeing, padding and printing processes and, if desired, after-treated with an acid-binding agent at room or elevated temperature. Such cationic dyestuffs are also suitable for dyeing wool and particularly suitable for dyeing synthetic fibres as, for example, of acetic rayon, polyamides and polyacrylo-nitrile.

The dyestuffs of the Formulae 3 and 4 used as starting material in the present process are inferior to the dyestuffs obtained by the process of the present invention regarding their affinity to the fiber. Owing to their cationic properties they have the advantage of migrating only to a small extent, when drying the dyed material, thus evener dyeings into which the dyestuff has better penetrated being obtained. Finally, the dyestuffs may be used in the form of fast solutions due to their solubility in water, whereas, for example, the dyestuffs applied for dyeing acetate silk have to be used in an aqueous suspension.

The following examples serve to illustrate the invention, but they are not intended to limit it thereto, the parts and percentages being by weight unless otherwise stated and the relationship of parts by weight to parts by volume being the same as that of the kilogram to the liter.

EXAMPLE 1

176 parts of the copper-phthalocyanine dyestuff of the formula

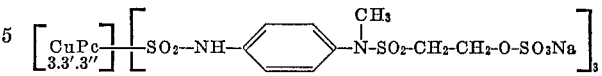

are stirred for 2 hours at about 60° C. together with 33 parts of an aqueous dimethylamine solution of 40% strength. The mixture is then cooled to about 0° C. The separated dyestuff is filtered off and dried in vacuo; there were obtained 140 parts of a greenish blue powder which when adding acetic acid dissolves in water to give a blue solution and dyes cotton in an acetic bath and after the fixation by an alkaline treatment turquoise shades; the dyeings possess a good fastness to washing and to soaping.

The dyestuff obtained has the formula

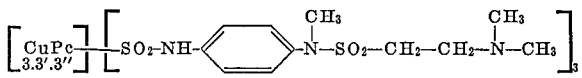

15 parts of this dyestuff are dissolved in 100 parts of dimethyl formamide while heating. After having cooled the solution 76 parts of dimethyl sulfate are slowly added dropwise, while stirring. After stirring for 3 hours 400 parts of alcohol are added. The separated dyestuff is filtered off and dried in vacuo. It has the formula

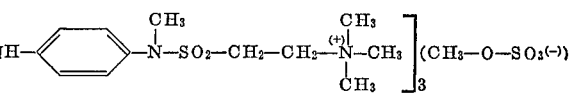

16 parts of a greenish blue powder are obtained which dissolves in water to give a blue-green solution and dyes cotton turquoise-blue shades according to the pad-steaming process.

The starting compound used for preparing this dyestuff can be produced, for example in the following manner:

44 parts of copper-phthalocyanine-3.3′.3″-trisulfochloride are introduced slowly at about 15° C. to 20° C., while stirring, into a solution of 104 parts of 4-amino-N-β-hydroxy-ethyl-sulfonyl-N-methyl-aminobenzene in 80 parts of dimethyl formamide and 46 parts of methanol. The whole is then after-stirred for 24 hours and the separated dyestuff is filtered off. The dyestuff is then washed with 2000 parts of hot water and dried in vacuo. 73 parts of the dyestuff of the formula

are obtained.

This dyestuff can be esterified in simple manner by introduction into sulfuric acid at about 0° to 5° C.

In an analogous manner there are obtained the following dyestuffs indicated in the table below:

| Example | Dyestuff | Tint on Cotton |
|---|---|---|
| 2 | [CuPc-3.3′.3″.3‴]—[SO₂—NH—⟨phenyl⟩—N(CH₃)—SO₂—CH₂—CH₂—N⁺(CH₃)(CH₃)]₄ (CH₃—O—SO₃⁻)₄ | turquoise-blue |
| 3 | [CuPc-3.3′.3″.3‴]—[SO₂—NH—⟨phenyl⟩—N(C₂H₅)—SO₂—CH₂—CH₂—N⁺(CH₃)(CH₃)(H)]₄ 2SO₄⁻ | turquoise-blue |
| 4 | [CuPc-3.3′.3″.3‴]—[SO₂—NH—⟨phenyl⟩—N(CH₃)—SO₂—CH₂—CH₂—N⁺(CH₃)(CH₃)(H)]₄ 4Cl⁻ | turquoise-blue |

We claim:
1. A compound of the formula

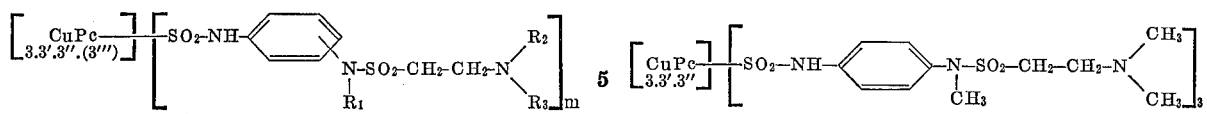

or

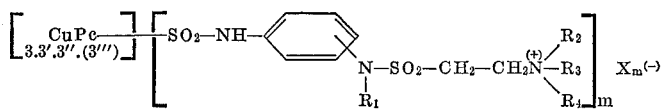

wherein CuPc is a copper phthalocyanine moiety, $R_1$, $R_2$, $R_3$ and $R_4$ are hydrogen, methyl or ethyl, X is a chlorine anion, $HSO_4$, $SO_4/2$, $C_2H_5-O-SO_3$ or $CH_3-O-SO_3$, and $m$ is 3 or 4, the sulfonamide substituent being linked in the meta- or para-position to a carbon atom of the benzenoid ring of the Pc nucleus and at most one sulfonamide substituent being linked to a benzenoid ring of the Pc nucleus.

2. The compound of the formula

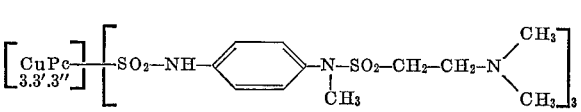

3. The compound of the formula

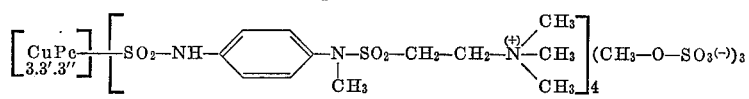

4. The compound of the formula

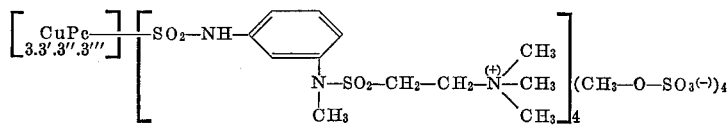

5. The compound of the formula

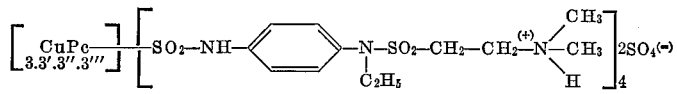

6. The compound of the formula

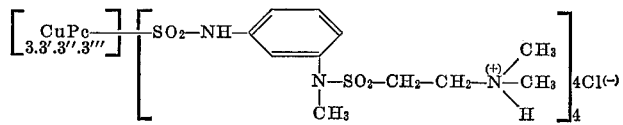

References Cited
UNITED STATES PATENTS
3,320,275    1967    Dien et al. _____ 260—314.5

HENRY R. JILES, Primary Examiner
H. I. MONTZ, Assistant Examiner

U.S. Cl. X.R.
8—54.2, 162